United States Patent [19]

Jensen et al.

[11] Patent Number: 4,679,193
[45] Date of Patent: Jul. 7, 1987

[54] RUNT PACKET FILTER

[75] Inventors: Gordon A. Jensen; Stephen P. Reames; Jerry D. Morris, all of Colorado Springs; Scott S. Neal, Woodland Park, all of Colo.

[73] Assignee: Hewlett Packard Company, Palo Alto, Calif.

[21] Appl. No.: 798,204

[22] Filed: Nov. 14, 1985

[51] Int. Cl.$^4$ .................... H04J 3/24; H04J 3/06; H04B 3/36
[52] U.S. Cl. .................... 370/94; 370/97; 370/108
[58] Field of Search .................... 370/85, 86, 88, 58, 370/94, 60, 97, 89, 108; 340/825.5

[56] References Cited

U.S. PATENT DOCUMENTS 3,908,084  9/1975  Wiley .................... 370/108
4,500,990  2/1985  Akashi .................... 370/85

Primary Examiner—Douglas W. Olms
Assistant Examiner—Frank M. Scutch, III
Attorney, Agent, or Firm—Christopher J. Byrne; Jon R. Stark

[57] ABSTRACT

Provided is a circuit for preventing local area network packets shorter than a predetermined bit length from being received by a local area network coprocessor. Serial data which would otherwise be received by the coprocessor is delayed by a data-shift register of predetermined bit length. Simultaneously, a carrier-sense-signal, which alerts the coprocessor that serial data is ready to be received, is modified by a carrier-sense-signal regeneration circuit. If the carrier-sense-signal is detected true by the regeneration circuit for a number of clock cycles equal to the number of bits in the data-shift register, then the carrier-sense-signal is delivered to the coprocessor and the data in the data-shift register is received by the coprocessor. Once the carrier-sense signal goes false, the regeneration circuit continues to deliver the carrier-sense-signal until the data-shift register empties.

5 Claims, 3 Drawing Figures

| PREAMBLE | DESTINATION | SOURCE | TYPE | DATA | FRAME CHECK |

FIG 1

RUNT PACKET FILTER

BACKGROUND OF THE INVENTION

A Local Area Network (LAN) is a communication network that provides interconnection of a variety of data communicating devices within a small area. *Local Networks,* p.2, by William Stallings (MacMillan Publishing Company, 1984). A typical LAN is a computer network limited to a geographically small area such as a plant site or an office building. Various devices, such as computers, terminals, etc., are "plugged into" the network at various locations on the network. Each such device is assigned an address so that digital communications between devices in the network may be properly delivered and received.

A well known commercially accepted LAN standard is encompassed by the Institute of Electrical and Electronic Engineers (IEEE) standard 802.3. This standard is well known in industry under the name "Ethernet." The IEEE 802.3 standard features a Carrier Sense Multiple Access with Collision Detection (CSMA/CD) media access method whereby two or more stations (devices) share a common bus transmission medium, typically a coaxial cable. To transmit over the LAN, a station or device waits for a quiet period on the bus, that is, no other station is transmitting, and then sends its intended message in bit serial form, at rates up to 10 Mbits/sec.

In the Ethernet/IEEE 802.3 system, messages between devices on the network travel in packets or frames on the bus. An Ethernet packet is displayed in FIG. 1. In examining the packet from head to tail, we see that it consists of a 64-bit preamble, a 48-bit destination address, a 48-bit source address, a 16-bit type field, a data field that may be from 46 bytes up to 1500 bytes long, wherein the last 4 bytes constitute 32-bit cyclic redundancy check (CRC) or frame check sequence. This Ethernet message format establishes the standard required for widespread implementation of LAN technology.

All devices on LANs, such as computers, terminals, test equipment, etc., must naturally possess LAN interface circuitry. A commonly used and important component of such circuitry is the Intel 82586 LAN co-processor. The 82586 performs numerous functions including, among many other things, framing, preamble generation and stripping, source address generation, destination address checking and CRC generation/checking. *Microsystem Component Handbook,* Volume II, p.7-288 (Intel, 1984).

An important segment of LAN technology in which the 82586 plays a critical role involves data communications test equipment, commonly known as protocol analyzers. These devices are designed to monitor, as well as generate, traffic on the LAN or Ethernet transmission bus and then analyze it for the purposes of field service; electronic data processing center support; network component research, development, manufacture, installation and service; and general network trouble shooting.

Such an analyzer may be required to "eavesdrop" on the LAN, examining packet traffic for packets of particular configurations. Used in such a manner, the analyzer reads packets off the LAN, without disrupting their transmission, and sends what it reads through a comparison process. The process involves initially placing the packets in memory and, at the same time, systematically circulating them past so-called trap machines which compare them with target configurations. The comparison process is known as filtering. Limited amounts of memory and other resources require that packets which fail to match the target configurations be discarded while the matching packets are retained in memory.

As noted, the 82586 receive data, that is, Ethernet packets, from the LAN bus and stores them in host device memory. The 82586 stores the packets in a very structured format. *Microsystem Component Handbook,* Volume II, pp. 7-291,7-294,7-309 (Intel, 1984). The structured format requires that numerous memory management functions be performed upon receipt of each packet. Such functions include updating of status words, updating linked lists, managing data buffers, etc.

Such memory management functions require a certain amount of time to complete. Hence, in LAN devices which are intended to receive packets in rapid succession, such as the protocol analyzers mentioned above, memory management functions may become overloaded. In particular, short packets, for instance, packets less than 64 bytes long from head to tail, are likely to interfere with the performance of a protocol analyzer since they still require that memory management functions be performed but they are less likely to carry valuable data. The 82586 can not keep up when it receives such "runt" packets in "save bad packets mode." It falls behind gradually until it "loses" data bytes. A novel circuit which interfaces between the 82586 and the LAN transmission medium serving to remove short packets, that is, runt packets that are less than 64 bytes long from head to tail, is the subject of the preferred embodiment of the present invention. Such a circuit will be referred to as a Runt Packet Filter.

SUMMARY OF THE INVENTION

In accordance with the preferred embodiment, the invention may be understood readily in the context of the 82586. As noted in the BACKGROUND, the 82586 receives data from the LAN transmission medium in bit serial form. The runt packet filter circuit sits in the serial data path as packets are pulled off the LAN transmission medium and delivered to the 82586.

The 82586 chip has a carrier-sense signal input pin which is used to receive a signal, from a standard Ethernet interface device known as the Manchester decoder, alerting the 82586 that there is packet traffic on the serial path. ANSI/IEEE Std. 802.3, sec. 7-3, 1985; *Microsystem Components Handbook,* Volume II, p.7-289 (Intel, 1984). The runt packet filter consists of a 512 bit (64 byte) data shift register and a carrier-sense signal regeneration circuit. The 512 bit data shift register implements a 512 clock cycle time delay in the data stream's progress toward the 82586. The carrier sense regeneration circuit modifies the carrier-sense signal received from the Manchester decoder. The carrier-sense regeneration circuit may send a true or a false carrier-sense signal to the receive 82586 chip, depending upon the length of the incoming packet. For packets below the 512 bit threshold, the carrier-sense regeneration circuit delivers a false carrier-sense signal to the receive 82586. For packets at or above the threshold length value, the carrier sense regeneration circuit delivers a true carrier-sense signal to the receive 82586, delayed 512 bit cycle times. Since the 82586 ignores information on the incoming data path unless it receives a true carrier-sense signal, the runt packets below the 512 bit/64 byte length threshold, are filtered out.

Although the preferred embodiment of the runt packet filter circuit implements a 512 bit length threshold, other threshold values are possible. Essentially, a designer need only alter the size of the data shift register and corresponding components in the carrier-sense signal regeneration circuit in order to implement different threshold values.

BRIEF DESCRIPTION OF THE DRAWINGS

FIG. 1 is a schematic diagram of an Ehternet packet.

DESCRIPTION OF THE PREFERRED EMBODIMENT

Figure 2:
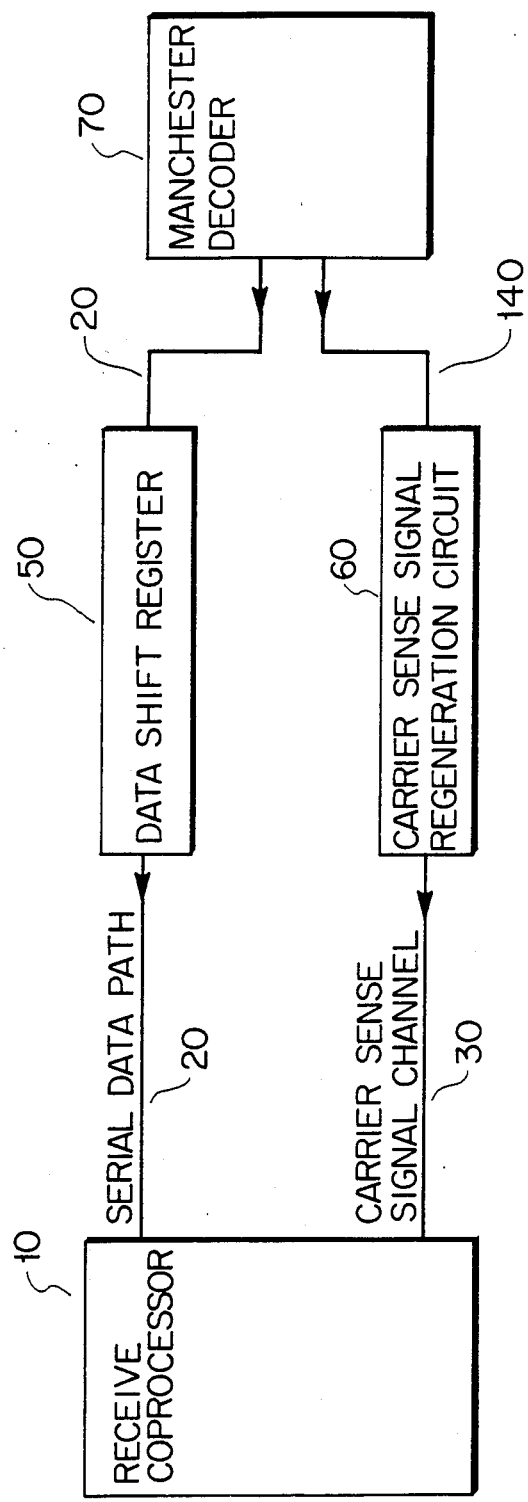
FIG. 2 is a schematic block diagram of a runt packet filter circuit.

FIG. 2 is a schematic block diagram of a runt packet filter circuit, showing the principle thereof. Reference numeral 10 designates the receiving 82586 chip. Reference numeral 20 designates the serial data path over which the 82586 receives Ethernet packets in bit serial form. Reference numeral 30 designates the channel over which the 82586 receives the carrier-sense signal which, when true, triggers acceptance by the 82586 of serial data along path 20. Reference numeral 50 designates a 512 bit, that is, 64 byte, data shift register, within the runt packet filter, which sits in the serial data path implementing a 512 bit cycle time delay in the serial data's progress toward the 82586 chip 10. Reference numeral 60 designates a carrier-sense signal regeneration circuit, within the runt packet filter, which intercepts the carrier-sense signal. Reference numeral 70 designates a Manchester decoder from which emanates the carrier-sense signal and serial data. The carrier-sense signal from the Manchester decoder is delivered to the carrier-sense regeneration circuit via the channel designated by reference numeral 140.

Figure 3:
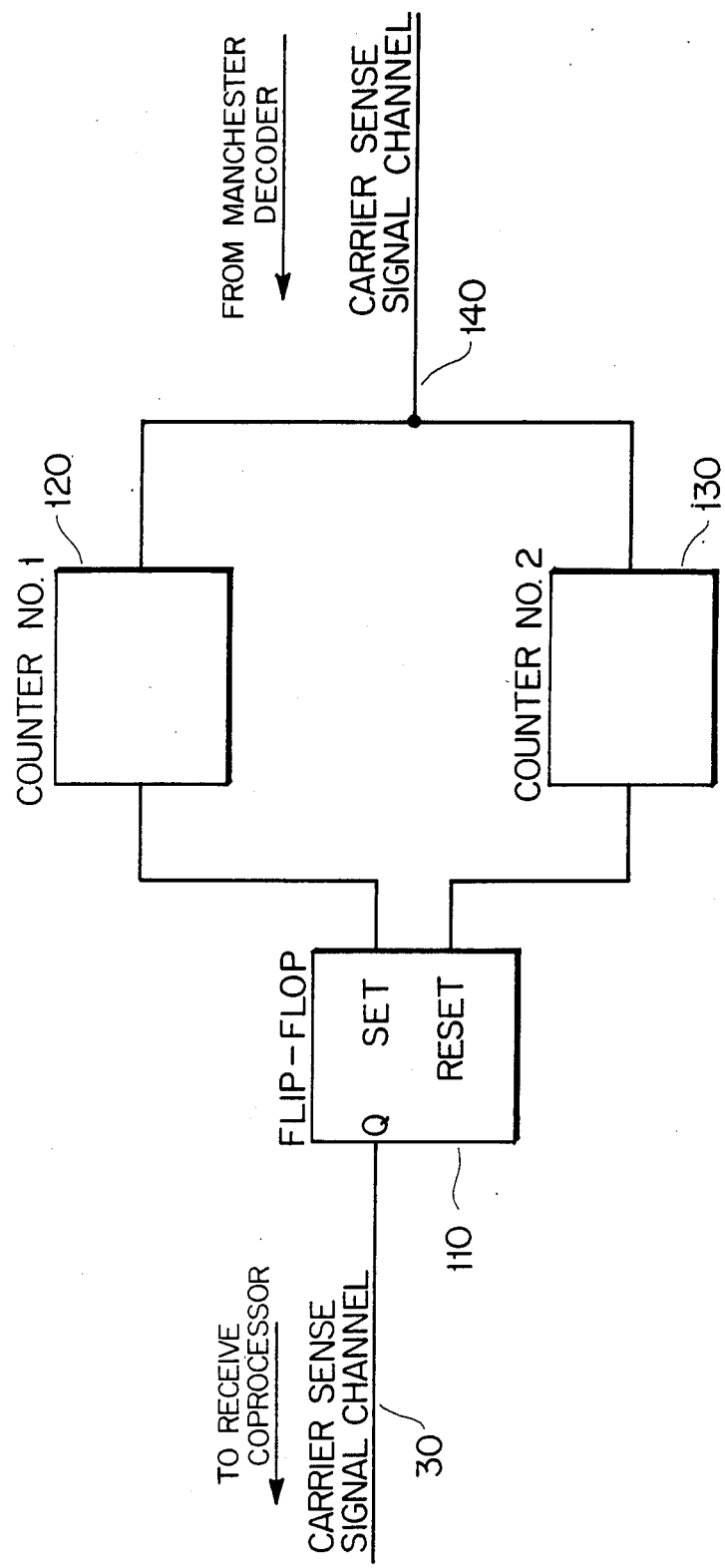
FIG. 3 is a schematic block diagram of a carrier-sense signal regeneration circuit.

In FIG. 3, we see that the chief components of the carrier-sense signal regeneration circuit consist of a flip-flop designated by reference numeral 110 and two counters, designated by reference numerals 120 and 130. (The preferred embodiment utilizes a J-K flip-flop but other flip-flop types are feasible.) The carrier-sense signal from the Manchester decoder is delivered to the carrier-sense regeneration circuit via the channel designated by reference numeral 140. The regenerated carrier-sense signal is passed along to the receive 82586 via the channel designated by reference numeral 30.

When the carrier-sense signal is detected to be true, Counter #1, designated by reference numeral 120, is started. If the carrier-sense signal goes false before Counter #1 reaches the count 512, Counter #1 is reset to zero. If the carrier-sense signal remains true for 512 counts, then Counter #1 will activate the flip-flop designated by reference numeral 110. The flip-flop will then drive the carrier-sense signal input of the 82586 via channel 30 with a true signal.

Once flip-flop 110 is set, the carrier-sense regeneration circuit waits for a false carrier-sense signal on channel 140. Once a false carrier-sense signal is received, Counter #2, designated by reference numeral 130, counts through 512 bit cycles and then resets flip-flop 110, thereby sending a false carrier-sense signal to the 82586 via channel 30. This second 512 bit cycle count time is necessary to allow the 512 bit data shift register of FIG. 2 to empty out before the carrier-sense signal goes false.

We claim:

1. A circuit for preventing local area network packets shorter than n bits from being received by a local area network coprocessor, said circuit comprising:

a local area network coprocessor having a serial data input port for receiving serial input data along a serial data path from a local area network decoder, and having a carrier-sense-signal input port for receiving a carrier-sense-signal generated by said local area network decoder, said carrier-sense-signal serving to alert said coprocessor that serial input data is present on said serial data path;

an n bit data-shift register for intercepting said serial-input-data from said decoder, said register implementing an n clock cycle delay in said serial input data's progress toward said serial data input port; and a carrier-sense-signal-regeneration means for intercepting said carrier-sense-signal from said decoder and for modifying said carrier-sense-signal.

2. A circuit as in claim 1, wherein the carrier-sense-signal-regeneration means comprises:

a first binary counter;

a second binary counter; and a set-reset flip-flop circuit, having an output tied to said carrier-sense-signal input port, a set input derived from said first binary counter, and a reset input derived from said second binary counter.

3. A circuit as in claim 2, wherein said flip-flop circuit is configured to deliver a true signal to said carrier-sense-signal input port if said flip-flop circuit receives a set signal, and to deliver a false signal to said carrier-sense-signal input port receives a reset signal.

4. A circuit as in claim 3, wherein said first binary counter is configured to start counting clock cycles when said carrier-sense-signal is true, to reset when said carrier-sense-signal is false, and to deliver a set signal to said set-reset flip-flop circuit if said first binary counter counts n clock cycles.

5. A circuit as in claim 4, wherein said second binary counter is configured such that if said carrier-sense-signal is detected false after n clock cycles have been counted by said first binary counter, said second binary counter counts n clock cycles and then delivers a reset signal to said set-reset flip-flop circuit.

* * * * *